United States Patent [19]

Dettner

[11] Patent Number: 5,797,100
[45] Date of Patent: Aug. 18, 1998

[54] METHOD FOR SETTING UP A CALL CONNECTION FOR A GROUP CALL TO A GROUP OF MOBILE RADIO SUBSCRIBERS IN A MOBILE RADIO NETWORK

[75] Inventor: Harald Dettner, Kirchhain, Germany

[73] Assignee: Siemens Aktiengesellschaft, Munich, Germany

[21] Appl. No.: 602,621

[22] Filed: Feb. 16, 1996

[30] Foreign Application Priority Data

Feb. 16, 1995 [DE] Germany .................. 195 05 270.6

[51] Int. Cl.⁶ .................. H04Q 7/38; H04Q 7/00
[52] U.S. Cl. .................. 455/518; 455/517; 455/416; 455/560; 455/422
[58] Field of Search .................. 455/518, 517, 455/519, 416, 414, 422, 520, 521, 526, 433, 456, 445, 560, 458, 403; 279/93.21, 158, 202, 204, 205

[56] References Cited

U.S. PATENT DOCUMENTS

| | | | |
|---|---|---|---|
| 5,095,529 | 3/1992 | Comroe et al. | 455/509 |
| 5,153,902 | 10/1992 | Buhl et al. | 455/458 |
| 5,274,837 | 12/1993 | Childress et al. | 455/510 |
| 5,295,180 | 3/1994 | Vendetti et al. | 455/456 |
| 5,369,684 | 11/1994 | Buhl et al. | 455/458 |
| 5,387,905 | 2/1995 | Grube et al. | 455/520 |
| 5,408,419 | 4/1995 | Wong | 455/560 |
| 5,450,405 | 9/1995 | Maher et al. | 455/519 |
| 5,457,809 | 10/1995 | Ohnishi | 455/518 |
| 5,465,391 | 11/1995 | Toyryla | 455/518 |
| 5,513,381 | 4/1996 | Sasuta | 456/520 |

FOREIGN PATENT DOCUMENTS

| | | |
|---|---|---|
| 2 265 791 | 10/1993 | United Kingdom . |
| 2 271 690 | 4/1994 | United Kingdom . |
| WO 93/05622 | 3/1993 | WIPO . |
| WO 93/07723 | 4/1993 | WIPO . |
| WO 94/28687 | 12/1994 | WIPO . |
| WO 95/01074 | 1/1995 | WIPO . |

*Primary Examiner*—Dwayne D. Bost
*Assistant Examiner*—Tracy M. Legree
*Attorney, Agent, or Firm*—Hill & Simpson

[57] ABSTRACT

In a method for setting up a call connection for a group call to a group of mobile radio subscribers in a mobile radio network, a subscriber calling a group of mobile radio subscribers dials a subscriber call number having numerals for the identification of the call as a group call, which number is received by a mobile switching center in the mobile radio network. The numerals of the subscriber call number are evaluated with reference to area information for the identification of a local service area and with reference to group information. After the evaluation of the numerals of the subscriber call number dialed for the group call, the area information and the group information are transmitted directly to the target mobile switching center responsible for the called group in the service area, by which the further connection set-up for the group call is initiated using the received area information and group information.

8 Claims, 1 Drawing Sheet

METHOD FOR SETTING UP A CALL CONNECTION FOR A GROUP CALL TO A GROUP OF MOBILE RADIO SUBSCRIBERS IN A MOBILE RADIO NETWORK

BACKGROUND OF THE INVENTION

2. Field of the Invention

The present invention is directed to a method for setting up a call connection for a group (conference) call to a group of mobile radio subscribers in a mobile radio network, as well as to a method for setting up a call connection for a group call initiated by a calling subscriber to a group of mobile radio subscribers in a mobile radio network.

2. Description of the Prior Art

In the event of an incoming call (mobile originated call) in a mobile radio network according to the GSM standard (Global System for Mobile Communication), a specific subscriber database, the so-called home location register for the storage of the subscriber data of all mobile radio subscribers, is first polled by a mobile switching center. The home location register, for its part, requests the momentary location of the called mobile radio subscriber from a visitor location register responsible for the called mobile radio subscriber; this momentary location is recognizable by means of a subscriber station number (mobile station roaming number) sent back to the home location register. This number is sent back to the mobile switching center making the request, which sets up the further connection to the mobile switching center that serves a service area that is already responsible for the called mobile radio subscriber. A method of this sort for setting up the call connection of calls coming into the mobile radio network is specified in the article "D900- Mobile Communication System," System Description SYD, Siemens AG, 1992 in chapter 8.2.2, page 62.

In addition, an international mobile subscriber identity number is used for the further connection set-up by the mobile switching center responsible for the called target subscriber.

For the transmission of information and data, there exists a standardized signaling protocol (mobile application part) between the installations of the mobile radio network operating according to the GSM method, according to which protocol the respective call connection for incoming and outgoing calls is to be set up.

In the event of a so-called group call (dispatcher originated call), in which a call connection to a group of mobile radio subscribers of the mobile radio network is supposed to be set up, for example from an operations controller to a number of employees at a known operating location, the existing signaling protocol according to the GSM standard would have to be used for this purpose and would have to be modified. Typical for group calls is the situation in which a local service area in the cellularly constructed mobile radio network can be allocated to the group of mobile radio subscribers affected by the call. This means that distinctions must be made in the visitor location register for the called group of mobile radio subscribers according to local service area and according to the respective group, which can lead to larger expenditures and possibly to difficulties in the existing procedural method according to the GSM standard with respect to the supplying of the subscriber station number and the international mobile subscriber identity number.

SUMMARY OF THE INVENTION

It is thus an object of the present invention to provide a method of the type mentioned above, by means of which a call connection for a group call to a group of mobile radio subscribers can be set up in a simple fashion and without interfering with the existing signaling protocol of the GSM standard.

This object is achieved in accordance with the principles of the present invention in a method having the following steps:

The subscriber calling the group of mobile radio subscribers dials (enters) a subscriber call number having numerals for the identification of the call as a group call, this subscriber number being received by a mobile switching center in the mobile radio network. The numerals of the subscriber call number are evaluated with reference to area information for the identification of the local service area, in which mobile radio subscribers of the called group are located, and with reference to group information for the identification of the called group. After the evaluation of the numerals of the subscriber call number dialed for the group call, the area information and the group information are transmitted directly to a target mobile switching center responsible for the called group in the service area; this switching center initiates the further connection set-up for the group call, using the received information.

Because a simple numerical evaluation of a subscriber call number, which is specific to group calls is carried out in the mobile radio network independently of the retrieval of the service data of the mobile radio subscribers from the respective registers of the mobile radio network (home location register and/or visitor location register), the existing signaling protocol does not have to be modified, and the associated problems of numbering, addressing and identification processing can thus be avoided. The home location and visitor location registers provided in the GSM mobile radio network remain completely unaffected by the call connection for group calls. The time needed for setting up the call connection according to the inventive method can be reduced in comparison to the usual duration of the connection set-up including the signaling protocol according to the GSM standard, since the registers are not polled. Moreover, no new protocol of its own is needed in addition to the existing signaling protocol, because the area information in the subscriber call number dialed and transmitted by the calling subscriber, which is necessary for the call connection set-up (routing), is easily accessible by means of evaluation of the numerals belonging to it in the respective mobile switching center, which finally initiates the call connection.

According to a further embodiment of the invention, the symbols such as the numerals, of the subscriber call number are decentrally evaluated by each mobile switching center that receives the subscriber call number on which the group call is based in the mobile radio network. According to another embodiment of the invention, this mobile switching center is the access mobile switching center in the mobile radio network that receives calls from telephone subscribers of other communications networks, e.g. the public telephone network.

According to another embodiment of the invention, the numerals of the subscriber call number are evaluated by the mobile switching center responsible for a mobile radio subscriber initiating the group call. By this approach the mobile switching center that receives the group call initiated by the mobile radio subscriber is itself the evaluation means for the recognition of a group call.

It is particularly advantageous if the numerals of the mobile switching center receiving the subscriber call number in the mobile radio network are transmitted to a separate mobile switching center for central evaluation. This single separate mobile switching center is thereby the only switching means in the mobile radio network responsible for the evaluation of the numerals of the specific subscriber call number for the group call, and is thereby responsible for group calls as regards the setting up of the call connection. As compared to the solution having the possibility of decentralized evaluation by means of several mobile switching centers in the mobile radio network, this leads to savings in the memory and control outlay for the evaluation of the specific subscriber call number.

According to a further embodiment of the invention, the evaluation of the numerals in the event of a group call is initiated by at least one piece of control information entered into the subscriber call number, which according to a preferred embodiment can be a virtual register number that is not allocated to any home location register used in the mobile radio network for the storage of the subscriber data of the mobile radio subscribers.

DESCRIPTION OF THE PREFERRED EMBODIMENTS

Figure 1:
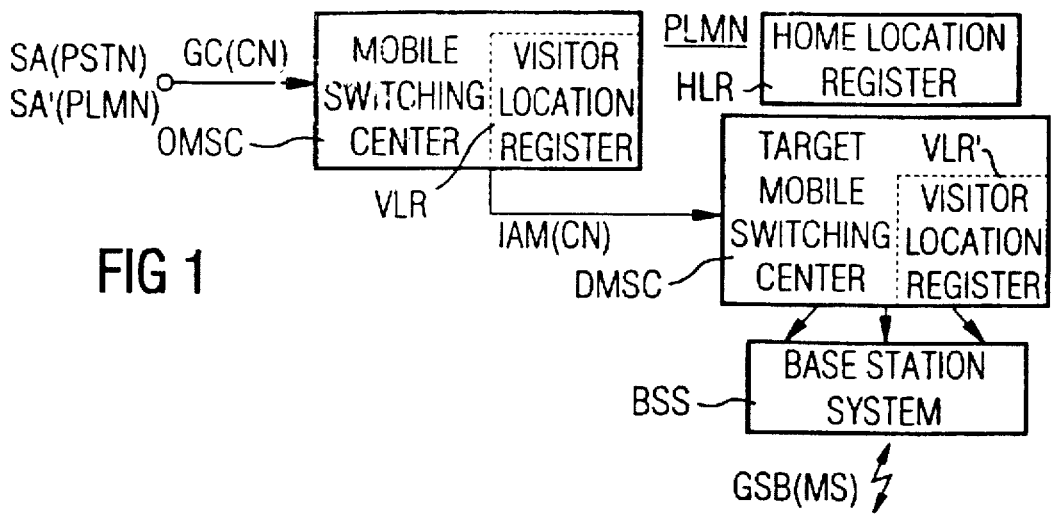
FIG. 1 illustrates the connection set-up for group calls of a digital mobile radio network with decentral evaluation of the subscriber call number, in accordance with the principles of the present invention.

FIG. 1 shows components of a mobile radio network PLMN for setting up a call connection for a group call GC initiated by a calling mobile radio subscriber SA' of the same mobile radio network PLMN or of another mobile radio network, or, by a calling telephone subscriber SA of a conductor (i.e., non-radio) communications system such as a public-switched transmission network PSTN, to a group of mobile radio subscribers GSB with mobile subscriber stations MS belonging thereto. The digital, cellularly constructed mobile radio network PLMN, operating according to the GSM standard, has at its disposal a mobile switching center OMSC with a visitor location register VLR, which, as an access mobile switching center (gateway mobile switching center), also receives calls from other communications networks in the mobile radio network PLMN. For the case in which the group call GC directed to the group of mobile radio subscribers GSB is sent by the calling mobile radio subscriber SA' of the mobile radio network PLMN, the mobile switching center OMSC represents the switching means responsible for this mobile radio subscriber SA'.

A target mobile switching center DMSC, having a visitor location register VLR', is connected to the mobile switching center OMSC; this target mobile switching center is responsible for the group of mobile radio subscribers GSB affected by the group call. A base station system BSS is connected with the target mobile switching center DMSC. This base station system BSS includes a base control unit and a base transmission/reception unit, with which a radio transmission of information via the air interface to the mobile subscriber stations MS of the called group of mobile radio subscribers GSB is possible. For completeness, FIG. 1 also includes a home location register HLR for the storing of the subscriber data of all mobile radio subscribers of the mobile radio network PLMN, but the home location register HLR is not affected in the setting up of the call connection to the group of mobile radio subscribers GSB participating in the group call GC according to the invention.

Figure 3:
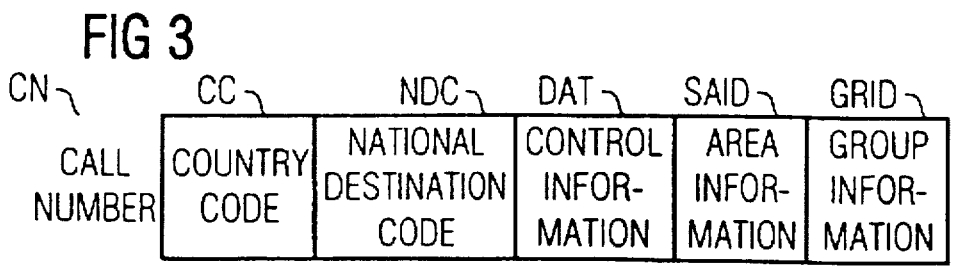
FIG. 3 illustrates the set-up of the subscriber call numbers for group calls in accordance with the principles of the present invention.

The group call GC is begun by the calling mobile radio subscriber SA', or by the calling telephone subscriber SA through the dialing of a subscriber call number CN comprising numerals for the identification of the call as a group call according to FIG. 3. The numerals of the incoming subscriber call number CN are evaluated by each mobile switching center OMSC in the mobile radio network PLMN operating as an access mobile switching center or as a mobile switching center responsible for the calling subscriber SA or SA'. This evaluation is made with reference to area information SAID (in the call number CN) for the identification of the local service area to which the target mobile switching center DMSC is allocated. In addition, group information (GRID) for the identification of the called group is derived from the received subscriber call number CN by the target mobile switching center DMSC; this information is in fact not required for the connection set-up (routing), but is used in determining the correct group for the group call.

In an IAM (initial address message) defined according to a standardized communications protocol, the subscriber call number CN comprising the group information and the area information is transmitted by the mobile switching center OMSC directly to the target mobile switching center DMSC, by which the further call connection set-up for the group call GC is initiated using the received area information. The connection set-up, beginning at the target mobile switching center DMSC via the base station system BSS to the individual mobile subscriber stations MS of the group of mobile radio subscribers GSB, ensues in a known fashion according to the standardized GSM method.

By means of an evaluation of the symbols, such as a simple numerical evaluation, of the specific subscriber call number CN defined for the group call GC, the call connection to a group of mobile radio subscribers GSB can be set up without requiring the use of the home location register HLR or the visitor location register VLR (or VLR'), with the standardized signaling protocol usually required in connection set-up for the polling of the local service parameters. The target mobile switching center DMSC can begin setting up the call connection immediately after receiving the information from the subscriber call number CN, without the necessity of an exchange of information with the visitor location register VLR', because the information necessary for the set-up is a part of the subscriber call number CN on which the group call is based, and was already transmitted in the address message IAM.

Figure 2:
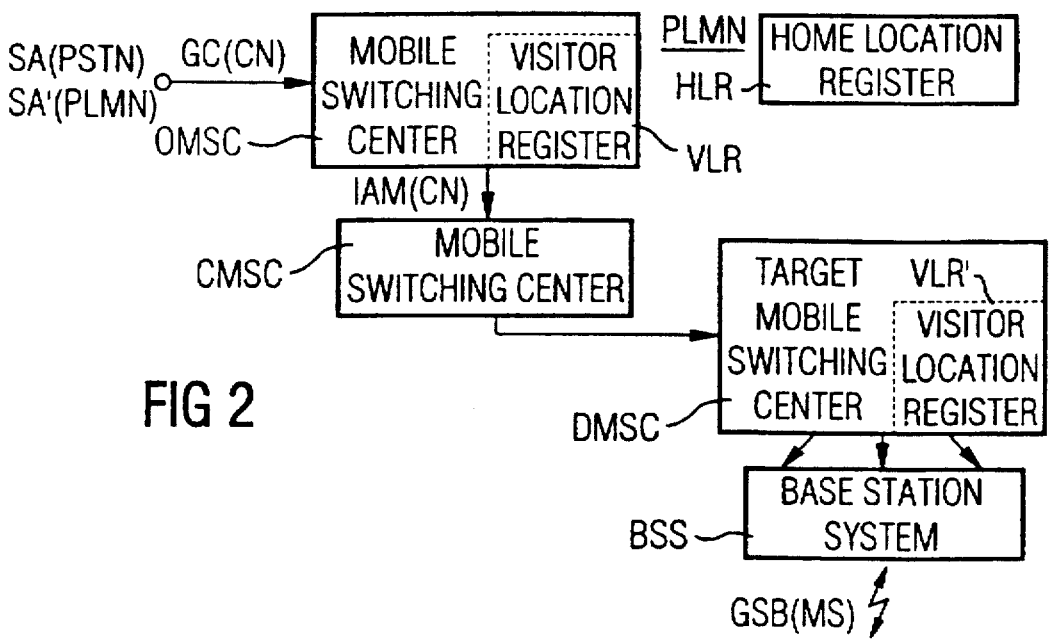
FIG. 2 illustrates the connection set-up for group calls of the digital mobile radio network with central evaluation of the subscriber call number and in accordance with the principles of the present invention.

In the same way, FIG. 2 shows the components of the mobile radio network PLMN represented in FIG. 1, but a separate mobile switching center CMSC, for the central evaluation of the numerals contained in the subscriber call number CN provided for group calls GC, is additionally arranged between the mobile switching center OMSC and the target mobile switching center DMSC. The group call GC with the subscriber call number CN belonging thereto, initiated by the calling subscriber SA of the conductor communications network PSTN (e.g. the public telephone network), or by the calling mobile radio subscriber SA', is received by the mobile switching center OMSC. The subscriber call number CN is relayed to the separate mobile switching center CMSC in the address message IAM; the separate mobile switching center CMSC centrally evaluates the incoming numerals with reference to the area information for the respectively called group of mobile radio subscribers GSB.

The subscriber call number CN is transmitted directly by the separate mobile switching center CMSC, in a further address message IAM, to the target mobile switching center DMSC, which initiates the further set-up of the call connection for the group call GC via the base station system BSS and the air interface to the mobile subscriber stations MS of the mobile radio subscribers GSB of the called group. The separate mobile switching center CMSC, arranged at a central location within the mobile radio network PLMN, is thus the only switching means in the mobile radio network that is responsible for the set-up of the call connection to the mobile radio subscribers GSB of the called group.

FIG. 3 shows the set-up of the subscriber call number CN initiated by the calling subscriber for the identification of the call as a group call to a group of mobile radio subscribers, whose service area—relative to the mobile switching center responsible for it—is known to the calling subscriber. The numerals of the subscriber call number CN are first entered in a known fashion, in the sequence whereby at the beginning an international country code CC is dialed and subsequently a national destination code NDC is dialed. In addition, the subscriber call number CN contains control information DAT that initiates the evaluation, by means of the mobile switching center OMSC, of the numerals relating to the presence of a group call. This control information DAT contains, in the simplest case, a virtual register number that cannot be allocated to any of the home location registers actually being used for storing the subscriber data of all mobile radio subscribers in the mobile radio network. It is similar to a virtual home register code number. The routing information, for determining that the call connection bypasses the home location register and is set up directly by the target mobile switching center, consists of the area information SAID for the identification of the respective local service area of the mobile radio subscribers belonging to the group. The group information GRID for the identification of the respectively called group, comprising a number of mobile radio subscribers who as target subscribers are not reachable individually, but only as a group, is used as selection information by the target mobile switching center.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for setting up a call connection for a group call directed to a group of mobile radio subscribers of a mobile radio network comprising the steps of:

placing a call from a calling subscriber by entering a subscriber call number having symbols for identification of said call as a group call to a called group of subscribers;

receiving said subscriber call number by a mobile switching center of said mobile radio network and evaluating said symbols of said subscriber call number with regard to area information for identification of a local service area in which the subscribers of said called group are located and with reference to group information for identification of said called group; and after evaluation of said subscriber call number, transmitting said area information and said group information to a target mobile switching center responsible for said called group in said service area, and setting up a call connection to each of the subscribers in said called group from said target mobile switching center using said area information and said group information.

2. A method as claimed in claim 1 wherein the step of evaluating said symbols of said subscriber call number comprises evaluating said symbols of said subscriber call number decentrally by the mobile switching center receiving the subscriber call number.

3. A method as claimed in claim 2 wherein the step of evaluating said symbols of said subscriber call number comprises evaluating said symbols of said subscriber call number by a mobile switching center responsible for the subscriber placing said call.

4. A method as claimed in claim 1 comprising transmitting said symbols of said subscriber call number from said mobile switching center which receives the subscriber call number to a separate mobile switching center and evaluating said symbols of said subscriber call number at said separate mobile switching center.

5. A method as claimed in claim 1 comprising the additional step of using a subscriber call number having control information contained therein which identifies that said symbols of said subscriber call number are to be evaluated for the presence of a group call.

6. A method as claimed in claim 5 comprising the step of:

employing control information consisting of a virtual register number not allocatable to any home location register used for storing subscriber data of the subscribers in said mobile radio network.

7. A method as claimed in claim 1 wherein the step of placing said group call comprises placing said group call from a mobile radio subscriber of said mobile radio network.

8. A method as claimed in claim 1 comprising the step of:

directing said group call to said called group by a telephone subscriber of a public-switched transmission network and receiving said group call by an access mobile switching center in said mobile radio network used for incoming calls from other communications networks.

\* \* \* \* \*